(12) United States Patent
Obillo

(10) Patent No.: US 11,366,023 B2
(45) Date of Patent: Jun. 21, 2022

(54) MULTI-PIECE THERMOWELL

(71) Applicant: Gas Turbine Specialty Parts LLC, Concord, MA (US)

(72) Inventor: Keith Obillo, Concord, MA (US)

( * ) Notice: Subject to any disclaimer, the term of this patent is extended or adjusted under 35 U.S.C. 154(b) by 0 days.

(21) Appl. No.: 16/920,385

(22) Filed: Jul. 2, 2020

(65) Prior Publication Data

US 2021/0003459 A1  Jan. 7, 2021

Related U.S. Application Data

(60) Provisional application No. 62/869,673, filed on Jul. 2, 2019.

(51) Int. Cl.
| | |
|---|---|
| *G01K 7/00* | (2006.01) |
| *G01K 1/00* | (2006.01) |
| *G01K 7/02* | (2021.01) |
| *G01K 13/02* | (2021.01) |
| *G01K 1/08* | (2021.01) |
| G01K 13/024 | (2021.01) |

(52) U.S. Cl.
CPC .............. *G01K 7/02* (2013.01); *G01K 1/08* (2013.01); *G01K 13/02* (2013.01); *G01K 13/024* (2021.01)

(58) Field of Classification Search
USPC .................. 374/138, 148; 136/231
See application file for complete search history.

(56) References Cited

U.S. PATENT DOCUMENTS

| | | | | |
|---|---|---|---|---|
| 3,911,747 | A * | 10/1975 | Sivyer .................... | G01K 13/02 374/E13.006 |
| 4,428,686 | A * | 1/1984 | Brax ........................ | G01K 1/14 136/230 |
| 4,984,904 | A * | 1/1991 | Nakano .................... | G01K 1/08 136/232 |
| 5,632,557 | A * | 5/1997 | Simons .................... | G01K 1/08 374/148 |
| 6,857,776 | B2 * | 2/2005 | Park ........................ | G01K 7/02 374/E1.016 |
| 2005/0152433 | A1 * | 7/2005 | Howard .................... | G01K 1/14 374/208 |
| 2011/0232378 | A1 * | 9/2011 | Tavares ................. | G01K 13/028 73/170.02 |
| 2013/0163637 | A1 * | 6/2013 | Parsons .................. | G01K 13/02 374/179 |
| 2014/0355653 | A1 * | 12/2014 | Heston .................... | G01K 13/02 374/208 |
| 2015/0068281 | A1 * | 3/2015 | Lyon ...................... | G01K 13/02 73/25.01 |
| 2015/0114443 | A1 * | 4/2015 | Berkland ................. | G01K 1/08 136/233 |
| 2017/0322091 | A1 * | 11/2017 | Sanchez ................... | G01K 1/08 |
| 2021/0140834 | A1 * | 5/2021 | Cummings ........... | F01D 25/243 |

* cited by examiner

*Primary Examiner* — Mirellys Jagan
(74) *Attorney, Agent, or Firm* — Prudens Law LLC; Shawn Diedtrich

(57) ABSTRACT

A multi-piece thermowell system includes a measurement protection device, a temperature measurement device, a torque mechanism, and a torque transfer mechanism.

4 Claims, 3 Drawing Sheets

MULTI-PIECE THERMOWELL

The present invention claims priority to and the benefit of U.S. Provisional Application No. 62/869,673, the contents of which are incorporated herein by reference.

TECHNICAL FIELD

The present invention is generally related to measuring temperature in industrial processes. More particularly, the present invention increases thermocouple stability within a thermowell application.

BACKGROUND

Thermowells are used to measure temperature in industrial processes. Rather than directly placing a temperature sensor into a process stream, a thermowell is used to enable the temperature-sensing device to be protected as well as removed and replaced without disturbing the process. Thermowells are tube-like devices that are lowered into the process stream of material (e.g., liquid or gas), which are closed at the end placed into the process stream and open at the other end. A temperature sensor is placed inside the open end to take temperature measurements.

A thermocouple is one type of temperature sensor that is placed inside a thermowell. Thermocouples are well known and widely used in many industries. A thermocouple is a device that will produce electricity when subjected to temperature. When a thermowell-thermocouple device is place within a process stream of material, the thermowell becomes heated. The heat from the thermowell walls is transferred to the thermocouple device. The electricity from the thermocouple device may be used to operate temperature sensing and control devices. Another type of sensor, a resistance temperature detector (RTD), may also be used in conjunction with a thermowell. An RTD employs a wound wire or thin film to measure temperature. As temperature increases, the electrical resistance of the RTD material will increase.

Typically, a thermowell is mounted in a process stream. Then a thermocouple or RTD is inserted in the open end of a thermowell. It is important that the thermocouple and the thermowell components placed near the process stream do not touch or otherwise interact with each other else inaccurate readings or damage to the devices will occur. For example, the end of the thermocouple begins to vibrate due to process flow and extreme temperatures. Such vibration can have devastating effects on the thermocouple and thermowell damaging both beyond repair. In some applications, the thermocouple is secured in the thermowell by one or more springs. However, in many applications, the springs are unable to maintain the pressure needed to keep the thermocouple's position stable. As a result, failures and the time and costs to repair such failures increase. What is needed is a system that increases thermocouple stability.

SUMMARY

While the way in which the present invention addresses the disadvantages of the prior art will be discussed in greater detail below, in general, the present invention provides for increasing thermocouple stability within a thermowell.

A multi-piece thermowell system includes any hardware and/or software suitably configured to stabilize a temperature measurement device within a thermowell. In general, the multi-piece thermowell system includes a measurement protection device, a temperature measurement device, a torque mechanism, and a torque transfer mechanism. The thermowell system is protected from damage through the unique arrangement of the components as discussed below. Such arrangement is able to maintain sufficient pressure on the thermocouple and stabilize the thermocouple's movement.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description or may be learned by the practice of the invention.

BRIEF DESCRIPTION OF THE DRAWINGS

In order to describe the manner in which the advantages and features of the present invention can be obtained, a more particular description of the present invention will be rendered by reference to specific embodiments and examples, which are illustrated in the appended drawings. Understanding that these drawings depict only typical embodiments of the invention and are not therefore to be considered to be limiting of its scope, the present invention will be described and explained with additional specificity and detail through the use of the accompanying drawings in which.

DETAILED DESCRIPTION

Figure 1:
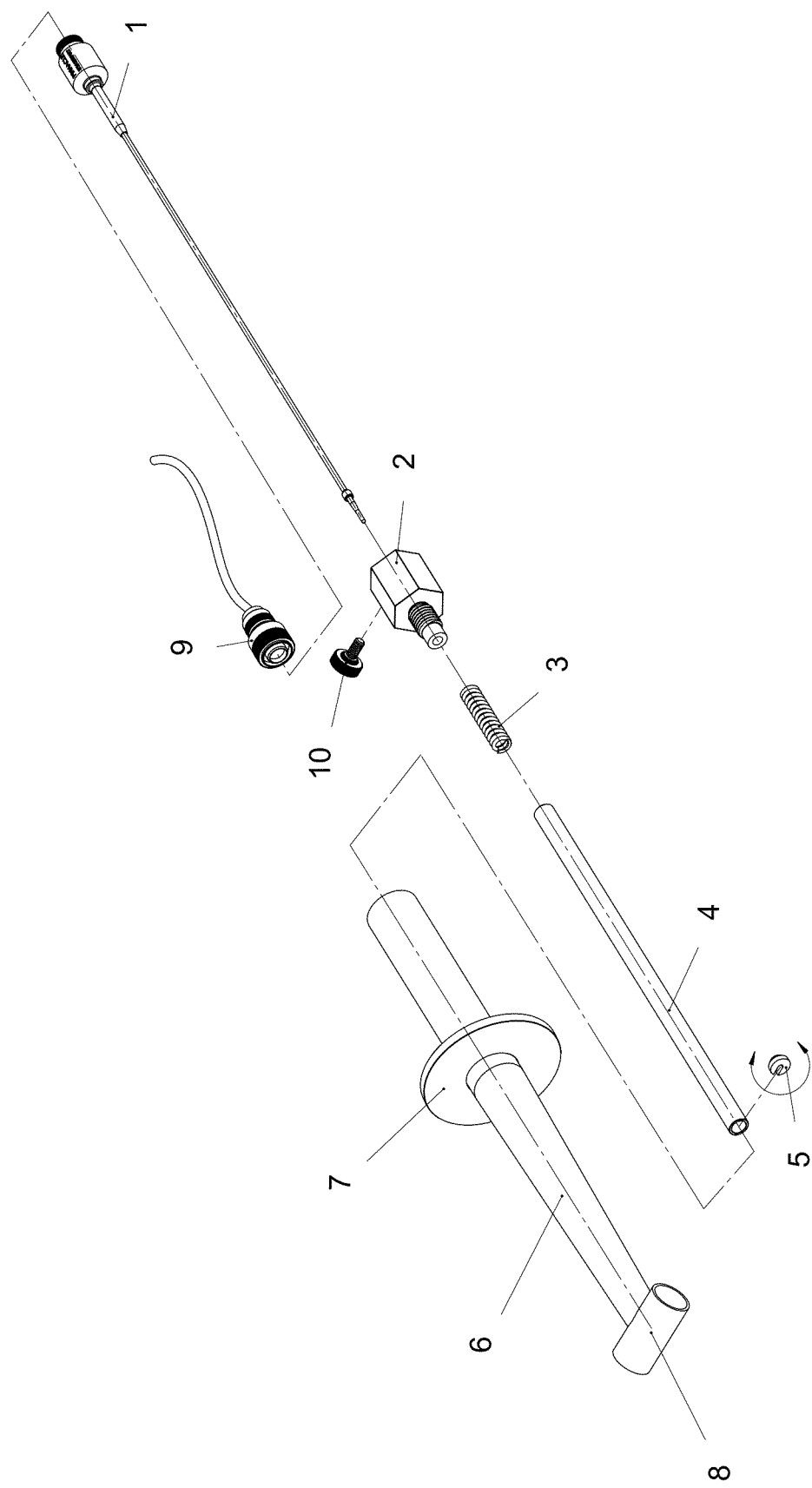
FIG. 1 illustrates an embodiment of a multi-piece thermowell.

Various embodiments of the invention are described in detail below. A person skilled in the relevant art will recognize that other components and configurations may be easily used or substituted than those that are described here without parting from the spirit and scope of the invention. As will be appreciated by one of ordinary skill in the art, the system may be embodied as a customization of an existing system, an add-on product, and/or a stand-alone system.

As will become apparent from the following descriptions, the present invention increases thermocouple stability within a thermowell. A multi-piece thermowell system includes any hardware and/or software suitably configured to stabilize a temperature measurement device within a thermowell. In general, the multi-piece thermowell system includes a measurement protection device, a temperature measurement device, a torque mechanism, and a torque transfer mechanism. The system may be constructed from or fabricated from a variety of materials suitable for a particular application of the thermowell system. In a preferred embodiment, the material is stainless steel or similar material. However, other well-known materials, such as plastic, aluminum, bronze, etc. may be used depending on the final application of the thermowell. The system may be constructed in a number of pieces depending on the application. In some embodiments, the thermowell system is constructed in three pieces. In other embodiments, the thermowell system is constructed in two pieces. However, any number of pieces used to construct system is within the spirit and scope of this invention. The multi-piece thermowell system may be used in any application that needs to measure temperatures of a process stream. In exemplary embodiments, the system is used in gas turbine applications.

The multi-piece thermowell system includes any hardware suitably configured to protect a temperature measurement device installed in a process stream. In some embodiments, this measurement protection device is known as a thermowell. A thermowell is usually a tubular like fitting closed at one end and installed in a process stream. The types and uses of thermowells are well known in the art and will not be explained in detail. However, any device known to protect temperature measurement devices installed in process streams is within the spirit and scope of the present invention.

The multi-piece thermowell system includes any hardware and/or software configured to measure temperature of a process stream when operably attached to a temperature measurement protection device. In some embodiments, the temperature measurement device is a thermometer. In other embodiments, the measurement device is a resistance detector. In yet other embodiments, the measurement device is a thermocouple.

The multi-piece thermowell system includes any hardware suitably configured as a torque mechanism to torque the temperature measurement device internally at the seat to prevent movement within the protection device. Typically, the measurement device is placed within the protection device and seated to the protection device through washers, springs, direct contact or other similar mounting structures. In an exemplary embodiment, the torqueing mechanism is a torque tube. In some embodiments, the torqueing mechanism is assembled as part of the protection device. In other embodiments, the torqueing mechanism is assembled as part of the temperature measurement device.

The multi-piece thermowell system includes any hardware suitably configured as a torque transfer mechanism. The torque transfer mechanism allows a user to transfer the desired torqueing of the temperature measurement device to the seat of the protection device. The torque transfer mechanism may be assembled as part of the temperature measurement device, the protection device, or as a stand-alone component. In an exemplary embodiment, the torque transfer mechanism is a torque nut.

Once assembled the temperature measurement device is allowed to stabilize or "float" within the protection device. The assembly enables the temperature measurement device to freely expand and contract within the thermowell. At the same time, the assembly prevents the temperature measurement device from becoming destabilized due to vibration of the temperature measure device or the thermowell.

While specific implementations involving a multi-piece thermowell system are shown, it should be understood that their description is merely illustrative and not intended to limit the scope of the various aspects of the invention.

FIG. 1 illustrates an exemplary embodiment of a multi-piece thermowell system. A measurement protection device is composed of a well housing 6 inserted through a mounting washer 7 and affixed to a shield 8. A torque mechanism comprising a torque tube 4 with a spring 3 inserted in the top of the torque tube 4 and a seat 5 affixed to the bottom of torque tube 4 as illustrated in FIG. 2A. A temperature measurement device 1 is inserted through the torque transfer mechanism, which is composed of a torque nut 2 and an optional thumb screw 10 attached to torque nut 2 for making fine torque adjustments. In exemplary embodiments, the temperature measurement device is a thermocouple. Well housing 6 receives the assembled temperature measurement device, torque mechanism, and torque transfer mechanism such that the tip of the temperature measure device is exposed with in the shield. A connector 9 is affixed to the top of temperature measurement device 1 so that temperature readings and other operational date may be transmitted (via wired or wireless mechanisms) to a site away from the thermowell system. The thermowell system is inserted into the process flow such that a portion of the process will flow through the shield 8 and expose the process to temperature measurement device 1.

Figure 2:
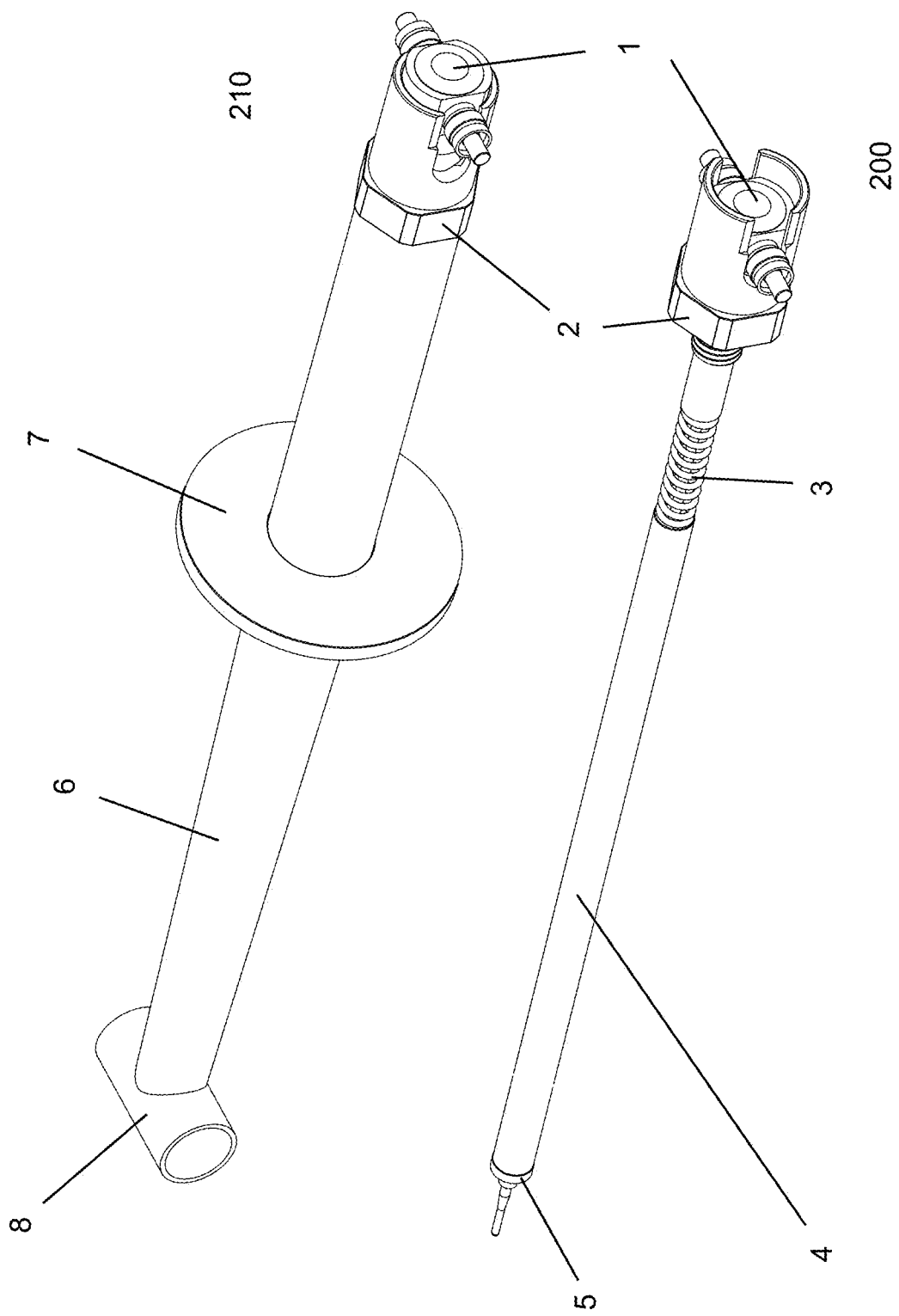
FIG. 2 illustrates a view of an assembled multi-piece thermowell.
Figure 2A:
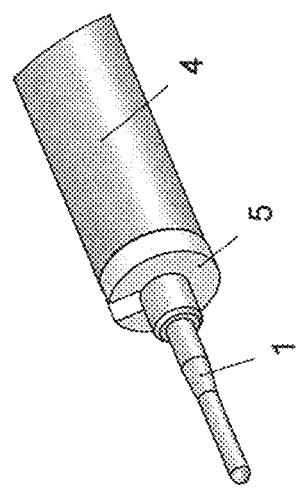
FIG. 2A illustrates a view of the end of a seated temperature measurement device.

FIG. 2 illustrates a view of an assembled thermocouple, torque mechanism, and torque transfer mechanism 200. The assembly 200 is placed within the well housing 6 to form a multi-piece thermowell assembly 210. The thermowell assembly 210 is placed into the process flow such that the process flows through the shield 8.

Although the above description may contain specific details, they should not be construed as limiting the claims in any way. Other configurations and equivalents of the described embodiments of the invention are part of the scope of this invention. The descriptions and embodiments are not intended to be an exhaustive or to limit the invention to the precise forms disclosed.

I claim:

1. A multi-piece thermowell comprising:
    a measurement protection device having a well housing inserted through a mounting washer wherein one end of the well housing is affixed to a shield tube, and wherein the shield tube is operationally connected to the well housing such that when the thermowell is placed within a process stream, the shield tube is parallel with the direction of the process stream;
    a torque mechanism comprising a torque mechanism tube, a compression spring, and a seating wherein a first end of the compression spring is in connection with a first end of the torque mechanism tube and the seating is in connection with a second end of the torque mechanism tube;
    a torque transfer mechanism comprising a torque nut in connection with a second end of the compression spring, the torque nut having an internal cavity;
    an assembled temperature measurement device comprising a temperature measurement device having a first end and a measurement end placed measurement end first through the torque nut, the compression spring, the torque mechanism tube, and the seating such that the first end of the temperature measurement device is seated partially within the internal cavity of the torque nut; and the assembled temperature measurement device is placed measurement end first through the well housing such that the measurement end is within the shield tube and the process stream.

2. The thermowell of claim 1, wherein the temperature measurement device comprises a thermocouple.

3. The thermowell of claim 1 wherein the torque transfer mechanism further comprises a thumb screw operationally connected to the torque nut.

4. The thermowell of claim 1, wherein the seating maintains stability of the measurement end of the temperature measurement device.

* * * * *